(12) United States Patent
Bikonda et al.

(10) Patent No.: US 12,019,548 B2
(45) Date of Patent: Jun. 25, 2024

(54) SYSTEMS AND METHODS FOR A CROSS-LAYER KEY-VALUE STORE ARCHITECTURE WITH A COMPUTATIONAL STORAGE DEVICE

(71) Applicants: Samsung Electronics Co., Ltd., Suwon-si (KR); Virginia Tech Intellectual Properties, INC, Blacksburg, VA (US)

(72) Inventors: Naga Sanjana Bikonda, Blacksburg, VA (US); Wookhee Kim, Blacksburg, VA (US); Madhava Krishnan Ramanathan, Blacksburg, VA (US); Changwoo Min, Blacksburg, VA (US); Vishwanath Maram, San Jose, CA (US)

(73) Assignees: Samsung Electronics Co., Ltd., Yongin-si (KR); Virginia Tech Intellectual Properties, INC, Blacksburg, VA (US)

( * ) Notice: Subject to any disclaimer, the term of this patent is extended or adjusted under 35 U.S.C. 154(b) by 0 days.

(21) Appl. No.: 17/839,439

(22) Filed: Jun. 13, 2022

(65) Prior Publication Data
US 2023/0333983 A1 Oct. 19, 2023

Related U.S. Application Data

(60) Provisional application No. 63/332,161, filed on Apr. 18, 2022.

(51) Int. Cl.
*G06F 12/0815* (2016.01)
*G06F 9/38* (2018.01)
(Continued)

(52) U.S. Cl.
CPC ........ *G06F 12/0815* (2013.01); *G06F 9/3834* (2013.01); *G06F 11/2056* (2013.01); *G06F 12/0868* (2013.01); *G06F 2212/466* (2013.01)

(58) Field of Classification Search
CPC .............. G06F 12/0815; G06F 9/3834; G06F 11/2056; G06F 12/0868; G06F 2212/466
See application file for complete search history.

(56) References Cited

U.S. PATENT DOCUMENTS

| 7,716,180 B2 | 5/2010 | Vermeulen et al. |
| 8,601,498 B2 | 12/2013 | Laurich et al. |

(Continued)

FOREIGN PATENT DOCUMENTS

| JP | 2020047277 A | 3/2020 |
| WO | 2020186081 A1 | 9/2020 |

(Continued)

OTHER PUBLICATIONS

Lu, Xiaoyi, et al., Scalable and Distributed Key-Value Store-based Data Management Using RDMA-Memcached, 'IEEE Data Eng. Bull. 40.1, 2017, 12 pages.

(Continued)

*Primary Examiner* — Angelica Ruiz
(74) *Attorney, Agent, or Firm* — Lewis Roca Rothgerber Christie LLP (57) ABSTRACT

Provided is a data storage system including a host including a host cache portion of a mirror cache, the host cache portion for storing metadata indicating a location of a data node that is stored in a kernel cache portion of the mirror cache, and a storage device including the kernel cache portion located in a common memory area.

20 Claims, 8 Drawing Sheets

(51) Int. Cl.
*G06F 11/20* (2006.01)
*G06F 12/0868* (2016.01)

(56) References Cited

U.S. PATENT DOCUMENTS

| | | |
|---|---|---|
| 8,634,247 B1 | 1/2014 | Sprouse et al. |
| 9,141,527 B2 * | 9/2015 | Atkisson ............. G06F 12/0895 |
| 9,323,457 B2 | 4/2016 | Blott et al. |
| 10,423,331 B2 | 9/2019 | Choi et al. |
| 10,740,287 B2 * | 8/2020 | Haviv ................... G06F 3/0685 |
| 10,915,813 B2 | 2/2021 | Margaglia et al. |
| 10,956,346 B1 | 3/2021 | Ben-Yehuda et al. |
| 2006/0010293 A1 | 1/2006 | Schnapp et al. |
| 2009/0327372 A1 * | 12/2009 | Ylonen ............... G06F 12/0253 |
| 2011/0320733 A1 | 12/2011 | Sanford et al. |
| 2013/0159452 A1 | 6/2013 | Saldana De Fuentes et al. |
| 2013/0198459 A1 * | 8/2013 | Joshi ................... G06F 12/0871 |
| | | 711/133 |
| 2019/0056926 A1 * | 2/2019 | Lindholm ................ G06F 8/65 |
| 2019/0205174 A1 | 7/2019 | Phelan et al. |
| 2019/0244140 A1 | 8/2019 | Lee et al. |
| 2020/0210114 A1 | 7/2020 | Hu et al. |
| 2020/0249878 A1 | 8/2020 | Bismuth et al. |
| 2020/0272577 A1 * | 8/2020 | Zeng ................... G06F 12/1018 |
| 2021/0181995 A1 | 6/2021 | Ki et al. |

FOREIGN PATENT DOCUMENTS

| | | |
|---|---|---|
| WO | 2020237409 A | 12/2020 |
| WO | WO-2022121274 A1 * | 6/2022 |

OTHER PUBLICATIONS

Xu, Shuotao, et al., Bluecache: A scalable distributed flash-based key-value store, Diss. Massachusetts Institute of Technology, 2016, 68 pages.

Zhang, Teng, et al., FPGA-accelerated compactions for LSM-based key-value store, 18th {USENIX} Conference on File and Storage Technologies ({FAST} 20, 2020, 15 pages.

EPO Extended European Search Report dated Sep. 8, 2023, issued in corresponding European Patent Application No. 23164759.5 (7 pages).

* cited by examiner

SYSTEMS AND METHODS FOR A CROSS-LAYER KEY-VALUE STORE ARCHITECTURE WITH A COMPUTATIONAL STORAGE DEVICE

CROSS-REFERENCE TO RELATED APPLICATION(S)

The present application claims priority to, and the benefit of, U.S. Provisional Application Ser. No. 63/332,161, filed Apr. 18, 2022, entitled "ARCHITECTURE OF CROSS-LAYER KEY-VALUE STORE WITH COMPUTATIONAL STORAGE DEVICE," the entire content of which is incorporated herein by reference.

FIELD

One or more aspects of embodiments according to the present disclosure relate to systems and methods for data storage.

BACKGROUND

The present background section is intended to provide context only, and the disclosure of any embodiment or concept in this section does not constitute an admission that said embodiment or concept is prior art.

In the field of computer storage, a key-value store may be implemented on a storage system (e.g., a system) including a host (e.g., a host computer) and a storage device (e.g., a device including a storage medium for storing data). The system may store a data node at a memory (e.g., a non-volatile memory) of the storage device. The data node may be accessed by a user of the system. The system may perform a variety of operations at the data node based on requests from the user. The system may identify a data node location of the data node and a key-value location in the data node on which to perform an operation based on key-value pairs. For example, the system may process a request, which is associated with a key, to (i) search for and find a location of a value (e.g., a data object) corresponding to the key, and to (ii) perform an operation, which is associated with the request, with respect to the value.

Accordingly, there is a need for methods, devices, and systems for efficiently processing requests with respect to key-value stores.

SUMMARY

Aspects of embodiments of the present disclosure relate to computer storage systems, and provide improvements to key-value stores.

According to some embodiments of the present disclosure, there is provided a data storage system including a host including a host cache portion of a mirror cache, the host cache portion for storing metadata indicating a location of a data node that is stored in a kernel cache portion of the mirror cache, and a storage device including the kernel cache portion located in a common memory area.

The data storage system may further include a search layer on the host, and configured to be processed by the host, and a data layer on the storage device, and configured to be processed by the storage device.

The search layer may include a tree structure, and the data layer may include the data node corresponding to a leaf node within a doubly-linked list of leaf nodes corresponding to the tree structure.

The storage device may further include a persistent memory coupled to the common memory area, and a processing circuit coupled to the common memory area.

The processing circuit may be configured to perform a data operation on the data node, and may be configured to write the data node to the kernel cache portion as an updated data node.

The host may be configured to determine the updated data node is populated onto the common memory area, and cause a peer-to-peer write from the common memory area to the persistent memory.

The host may be configured to determine that an amount of available space in the data node is less than an amount of space for accommodating a data access request corresponding to the data node, and assign an extension node to the data node.

The storage device may further include a processing circuit configured to update metadata of the data node to point to the extension node, the metadata of the data node may indicate a first version number, and metadata of the extension node may indicate the first version number.

The processing circuit may be configured to update the extension node, update the metadata of the data node to indicate a second version number to identify the data node as an updated data node, update the metadata of the extension node to indicate the second version number to identify the extension node as an updated extension node, and update the metadata of the updated data node to point to the updated extension node.

The processing circuit may be configured to write the updated extension node to a storage of the storage device in an out-of-place manner, and write the updated data node to the storage in an in-place manner.

The host may be configured to manage concurrent access to the storage device by receiving a read request and acquiring a read lock on the data node, or receiving a write request and acquiring a write lock on the data node.

According to other embodiments of the present disclosure, there is provided a method of data storage, the method including locating, in a host cache portion of a mirror cache, metadata indicating a location of a data node stored in a storage device, the host cache portion being stored on a host, and determining that the data node is present in a kernel cache portion of the mirror cache, the kernel cache portion being stored on a common memory area of the storage device.

The method may further include locating, by the host, a partial key in a search layer to find the metadata indicating the location of the data node.

The method may further include determining that the data node has an amount of available space that is less than an amount of space for accommodating a data access request, and assigning an extension node to the data node.

The storage device may include a persistent memory coupled to the common memory area, and a processing circuit coupled to the common memory area.

The method may further include updating, by the processing circuit, metadata of the data node to point to the extension node, the metadata of the data node and metadata of the extension node may indicate a first version number.

The method may further include updating the extension node, updating the metadata of the data node to indicate a second version number, updating the metadata of the extension node to indicate the second version number, the second version number may identify the data node as an updated data node and may identify the extension node as an updated extension node, and updating the metadata of the updated data node to point to the updated extension node.

The method may further include writing the updated extension node to a storage of the storage device in an out-of-place manner, and writing the updated data node to the storage in an in-place manner.

According to other embodiments of the present disclosure, there is provided a non-transitory computer readable medium implemented on a key-value store, the non-transitory computer readable medium having computer code that, when executed on a processor, implements a method of data storage, the method including locating, in a host cache portion of a mirror cache, a host cache metadata indicating a location of a data node stored in a storage device, and determining that the data node is present in a kernel cache portion of the mirror cache in accordance with the host cache metadata, the kernel cache portion being stored on a common memory area of the storage device.

The method may further include locating a partial key in a search layer to find the host cache metadata.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity, and have not necessarily been drawn to scale. For example, the dimensions of some of the elements, layers, and regions in the figures may be exaggerated relative to other elements, layers, and regions to help to improve clarity and understanding of various embodiments. Also, common but well-understood elements and parts not related to the description of the embodiments might not be shown in order to facilitate a less obstructed view of these various embodiments and to make the description clear.

DETAILED DESCRIPTION

Features of the inventive concept and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described.

Unless otherwise noted, like reference numerals, characters, or combinations thereof denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

In the detailed description, for the purposes of explanation, numerous specific details are set forth to provide a thorough understanding of various embodiments. It is apparent, however, that various embodiments may be practiced without these specific details or with one or more equivalent arrangements.

It will be understood that, although the terms "zeroth," "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or component is referred to as being "on," "connected to," or "coupled to" another element or component, it can be directly on, connected to, or coupled to the other element or component, or one or more intervening elements or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or component is referred to as being "between" two elements or components, it can be the only element or component between the two elements or components, or one or more intervening elements or components may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When one or more embodiments may be implemented differently, a specific process order may be performed differently from the described order. For example, two consecutively described processes may be performed substantially at the same time or performed in an order opposite to the described order.

Any of the components or any combination of the components described (e.g., in any system diagrams included herein) may be used to perform one or more of the operations of any flow chart included herein. Further, (i) the operations are merely examples, and may involve various additional operations not explicitly covered, and (ii) the temporal order of the operations may be varied.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

As mentioned above, in the field of computer storage, a key-value store may be implemented on a storage system (e.g., a system). The system may include a host (e.g., a host computer) and a storage device (e.g., a device including a storage medium for storing data). The storage device may store a data node at a memory (e.g., a non-volatile or persistent memory) of the storage device. A user of the system may request access to the data node. For example, the user may cause a data access request (e.g., a write request, a read request, etc.) to be received by the system. The system may find the data node and perform an operation (e.g., a write operation, a read operation, etc.) with respect to the data node, based on the data access request.

The data node may include a set of key-value pairs corresponding to a same partial key. The partial key may be stored in a search layer of the system. The data node may include a metadata section and a range of key-value pairs. For example, each data node may hold a range of key-value pairs, such that the largest valued key in a current data node (e.g., a first data node) may be smaller than a smallest valued key of a next data node (e.g., a second data node that is adjacent to the first data node). Thus, an ascending order of key ranges between adjacent data nodes may be maintained (e.g., provided).

The system may be configured to perform a variety of operations with respect to the data node. For example, the system may perform Insert(key, value), Update(key, value), Remove(key), Lookup(key), or Scan(key, range)) operations on the data node based on requests from the user. Based on receiving a key-value pair, the system may identify the data node, and then may identify the precise location within the data node at which to perform an operation. The system then may perform the operation associated with the received key-value pair. For example, the system may process a request, which is associated with a key of a key-value pair, to (i) locate a value (e.g., an object) corresponding to the key, and to (ii) perform an operation, which is associated with the request, with respect to the value at the data node.

Accordingly, it may be suitable to develop methods, devices, and systems for more efficiently processing requests with respect to key-value stores.

Some key-value stores may be designed to use either solely computational resources of the host or solely computational resources of the storage device (e.g., solid state drive (SSD)). For example, some key-value stores may use host computational resources to perform both control plane operations and data manipulation (e.g., data processing) operations. In such key-value stores, a host processor (e.g., a central processing unit (CPU)) may receive requests from a user (e.g., from an application corresponding to the user) to look up (e.g., locate) a key and to fetch the requested data to a host dynamic random access memory (DRAM). The data may be used by the CPU to handle computations.

Some key-value stores may have computational storage capabilities. That is, key-value stores may be implemented using a storage device including a processing circuit (e.g., an accelerator, such as a field programmable gate array (FPGA)). The FPGA may be used to manipulate (e.g., process) a data layer only as a "service" (e.g., to perform pure computation, such as encoding or decoding).

Some key-value stores implemented with computational storage capabilities may use storage device resources to perform both control plane operations and data manipulation (e.g., data processing) operations. That is, key-value stores may be fully implemented on a storage device. In such key-value stores, a processing circuit of the storage device may receive requests from a user application to look up (e.g., locate) a key and to fetch the requested data to a storage device DRAM for the processing circuit to handle computations.

To provide data durability and operation atomicity, such as to protect against data loss due to a device failure, key-value stores may be implemented in accordance with crash-consistency policies for data recovery.

Some key-value stores may be implemented with crash-consistency policies incorporating write-ahead logging (WAL) (e.g., UNDO logging and REDO logging). For example, in WAL, any write made to the key-value store may be stored in a log file (e.g., a write-ahead log) persisted onto a non-volatile memory of the storage device before a corresponding data location may be modified according to the write operation.

With fast paced advancements in data storage, key-value store designs that solely use the computational resources of either a host or a storage device may suffer from compute bottlenecks and/or network bottlenecks (e.g., CPU bottlenecks). That is, although storage devices have become faster and more intelligent, their performance may not be fully realized due to, for example, the CPU being unable to process and transfer data efficiently enough. In key-value stores implemented with a storage device having computational storage capabilities (hereinafter, a computational storage device), a conventional host-based cache may underutilize the advantages provided by peer-to-peer (P2P) transfer between the processing circuit (e.g., the FPGA) of the computational storage device and the memory (e.g., the non-volatile memory, or the storage) of the storage device. Thus, the compute power of the FPGA may be underutilized.

Regarding crash-consistency policies, key-value stores implemented with logging-based consistency policies may result in various problems, such as increased write amplification, input/output (I/O) interdependencies, and slow request processing.

To improve key-value store performance, aspects of embodiments of the present disclosure provide a key-value store that may be logically divided to leverage both a host processor of a host and a processing circuit of a computational storage device. For example, a key-value store according to the present disclosure may have reduced CPU bottleneck problems and reduced data fetch stalls in preprocessing pipelines (e.g., preprocessing pipelines for artificial intelligence (AI) and machine learning (ML) applications).

In some embodiments, data plane computation may be offloaded from a host processor to a computational storage device to leverage the high-speed bandwidth of the computational storage device.

In some embodiments, a key-value store may be divided into two parts: (1) a search layer (e.g., internal nodes in a B-tree) processed by the host processor; and (2) a data layer (e.g., leaf nodes in the B-tree) processed by the processing circuit on the computational storage device. Although examples of the search layer and the data layer disclosed herein may refer to a B-tree index structure, it should be understood that the present disclosure is not limited thereto. For example, a search layer and a data layer according to aspects of embodiments of the present disclosure may be implemented via any suitable sorted index structure (e.g., B+Tree, Trie, or Adaptive Radix Tree).

The search layer may store a partial key. The data layer may store key fingerprints corresponding to the keys that belong to a particular data node. Thus, a key fingerprint may identify a precise location, within a data store, of a value corresponding to a key-value pair.

As discussed in further detail below in reference to the figures, a key-value store (e.g., a cross-layered key-value store) according to one or more embodiments may use a cross-layered approach to use the host processor in the control plane, and to offload the data plane computation onto the processing circuit of a computational storage device. Accordingly, the key-value store may leverage the high bandwidth of the computational storage device.

The key-value store also may incorporate one or more of the following features discussed in further detail below: (1) a cross-layered approach for improved throughput and scalability; (2) a cross-layered cache (e.g., a mirror cache) for improved data locality (e.g., to reduce or eliminate unnecessary (e.g., redundant) data movement); and (3) a version-based crash consistency for simplified crash consistency (e.g., a crash-consistency policy that is based on version numbering instead of write-ahead logging).

In addition to having improved efficiency, the key-value store may be integrated into computational pipelines to significantly reduce data fetch stalls, and to realize the advantages of offloading preprocessing onto a computational storage device.

Additionally, although the present disclosure refers to a host coupled to one computational storage device, the present disclosure is not limited thereto. For example, in some embodiments, a key-value store according to the present disclosure may take advantage of a heterogeneous system with multiple storage devices and accelerators connected in a server.

Systems and methods for a cross-layer key-value store with a computational storage device may provide for a key-value store with reduced bottlenecking (e.g., greater overall system bandwidth), improved throughput, scalability, and data locality. Such improvements may be achieved by logically dividing the key-value store into: (1) a search layer that is stored on a host memory and manipulated (e.g., processed) by the host processor; and (2) a data layer that is stored on a computational storage device and processed by a processing circuit of the computational storage device. Furthermore, in some embodiments, the cross-layer key-value store may provide for simplified crash consistency by being implemented with a version-based crash consistency, instead of a logging-based crash consistency.

For example, a key-value store may be implemented as, or implemented on, a system including a host and a storage device including persistent memory (e.g., a solid state drive (SSD) or other non-volatile memory portion of the storage device), a processing circuit (e.g., an FPGA), and a common memory area (CMA) linked to the persistent memory and the processing circuit (e.g., via P2P memory).

The host may store and manipulate (e.g., process) a search layer including a sorted index (e.g., a tree structure). The host may also store and manipulate (e.g., process) a host-cache portion of a "mirror cache" of the key-value store. The storage device may store and process a data layer including leaf nodes (e.g., data nodes) of the tree structure. The storage device may also store and process a kernel-cache portion of the mirror cache.

The host cache may be implemented as a two-dimensional (2D) array. Each entry of the host cache storing metadata corresponding to data nodes may be stored at the storage device.

The kernel-cache may be implemented as a one-dimensional (1D) array of data nodes stored in the CMA. The host may store each entry of the host cache within the host cache at a same offset as an offset of the data nodes stored within the kernel cache (e.g., to reduce an amount of data movement within the system).

The key-value store may distribute responsibilities between a host processor (e.g., a CPU) and the processing circuit (e.g., an FPGA) of the storage device. For example, the key-value store may split the control of processing requests to access data nodes stored on the storage device. Accordingly, the host processor may act in a control plane to trigger (e.g., cause or issue) kernel calls, issue data transfers to or from the persistent memory (hereinafter, storage), and manage crash consistency. The processing circuit of the storage device may handle data plane operations so that the key-value store may take advantage of the relatively higher access throughput of the computational storage device.

Additionally, the key-value store may be implemented to provide variable-length key-value support with a version-based crash consistency mechanism that maintains version metadata to avoid the overhead of logging techniques (e.g., WAL).

Accordingly, the key-value store according to aspects of embodiments of the present disclosure may provide several improvements and advantages in comparison to other key-value store designs, including: (1) reducing bottlenecks by being split logically into a search layer and a data layer to use the host processor only as the control plane and to offload data plane tasks to the processing circuit; (2) improving I/O bandwidth utilization by transferring data to the processing circuit through P2P memory and, thus, reducing network hops (e.g., reducing a number of data transfers between storage and host), thereby increasing overall throughput; (3) avoiding journaling (e.g., computationally expensive/data-intensive logging-based recovery) by implementing version-based crash consistency with atomic updates (e.g., 4 KB-sized updates); and (4) allowing for scalability without synchronization issues due to the search layer and data layer being logically and physically split between the host processor and the processing circuit.

Figure 1:
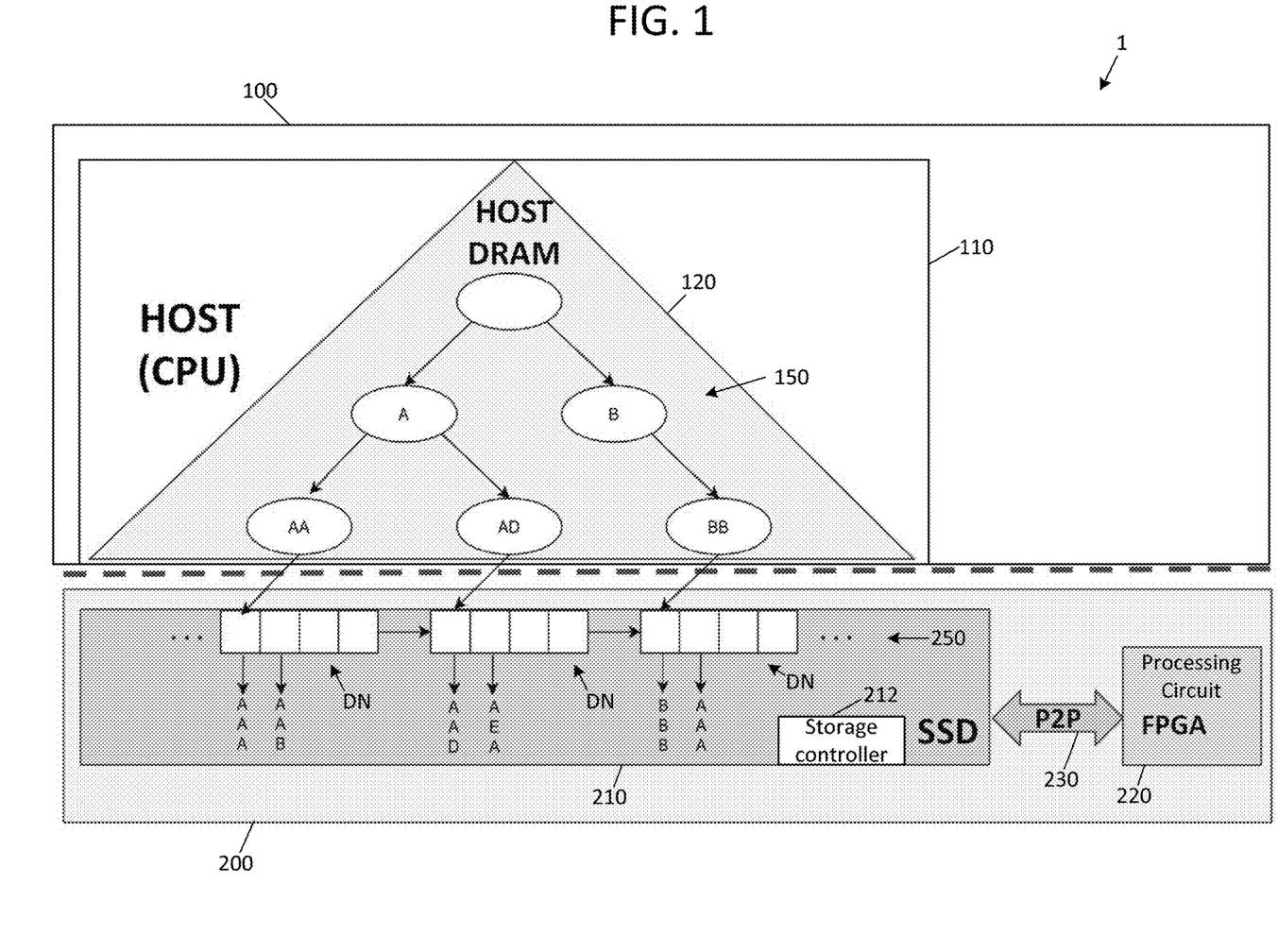
FIG. 1 is a system diagram depicting a data storage system including a search layer and a data layer, according to some embodiments of the present disclosure.

FIG. 1 is a system diagram depicting a data storage system including a search layer and a data layer, according to some embodiments of the present disclosure.

Referring to FIG. 1, the system 1 may include a host 100, which may be coupled to a storage device 200 (e.g., a computational storage device). The host 100 may include a host processor 110 (e.g., a host CPU) and a host memory 120 (e.g., a host DRAM).

The storage device 200 may include (e.g., may be) a computational storage device including a storage 210 (e.g., a persistent or non-volatile memory), a storage controller 212 (e.g., a non-volatile memory express (NVMe) assisting controller), a processing circuit 220 (e.g., an accelerator, such as an FPGA), and a common memory area (CMA) 230 (e.g., a P2P memory of a computational storage device, which may be a portion of a DRAM of the processing circuit 220 that is linked with, or shared with, both the storage 210 and the processing circuit 220).

Figure 4:
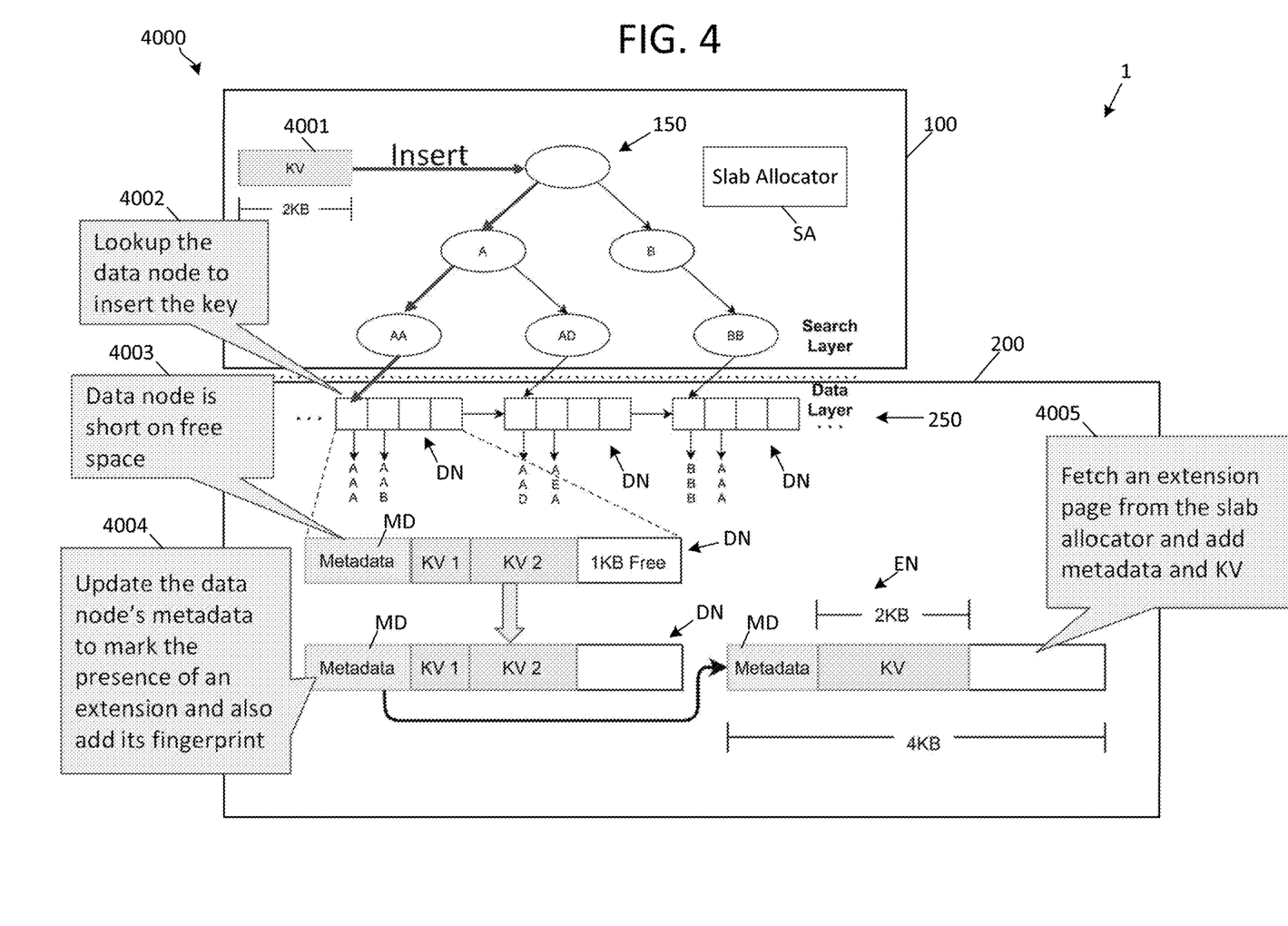
FIG. 4 is a combined flowchart and system diagram depicting operations of methods of data storage within a data storage system providing variable-length key-value support, according to some embodiments of the present disclosure.

The storage device 200 may store one or more data nodes DN (see also FIG. 4). Each data node DN may include a set of key-value pairs (e.g., multiple key-value pairs, which may be arranged in ascending order, and which are depicted as "AAA" and "AAB," etc. in FIG. 1 and FIG. 4). The set of key-value pairs in a corresponding data node may correspond to a same partial key in a search layer 150 of the host memory 120.

The system 1 may include (e.g., may be) a key-value store having a cross-layered architecture, where responsibilities, such as processing data access requests, are split between the host processor 110 and the processing circuit 220 to improve performance over conventional key-value stores. For example, the search layer 150 may be stored on the host memory 120, and a data layer 250 may be stored on the storage device 200 (e.g., in the storage 210). The search layer 150 may be manipulated (e.g., processed, maintained, or controlled) by the host processor 110. The data layer 250 may be processed by the processing circuit 220.

Accordingly, the host processor 110 may act as a control plane and may perform suitable operations, such as triggering FPGA kernel calls (e.g., kernel calls directed to the processing circuit 220), issuing (e.g., causing) data transfers to and from the storage 210, and managing concurrency control (e.g., managing concurrent access to the storage device 200 from multiple requests), etc. Also, the processing circuit 220 may manage operations of a data plane, such as manipulating (e.g., processing) and handling data (e.g., executing data node updates and updating corresponding metadata for updated data nodes).

By delegating manipulations (e.g., processing) of the search layer 150 to the host processor 110, while delegating the data layer 250 operations to the processing circuit 220, different sources of compute power may be used more suitably. For example, the system 1 may leverage the internal bandwidth (e.g., the high internal bandwidth) between the storage 210 and the processing circuit 220 while also reducing (e.g., minimizing) data movement due to P2P data transfer (e.g., direct data transfer) between the storage 210 and the processing circuit 220.

The search layer 150 may be implemented as, for example, a tree structure on the host memory 120, which stores partial keys (e.g., stores partial keys as internal nodes in a B-tree meta structure). Although the search layer 150 and the data layer 250 are described herein as corresponding to a tree structure, it should be understood that the present disclosure is not limited thereto, and other sorted index structures may be suitable.

The data layer 250 may be implemented as a doubly-linked list of leaf nodes (e.g., leaf nodes in the B-tree structure) corresponding to the data nodes DN on the storage device 200. The search layer (e.g., a tree structure) may help in the fast lookup of point queries. The data layer, which is a doubly-linked list, may store key-value pairs in ascending order, thus, resulting in fast range queries. Accordingly, unlike some conventional key-value stores that are not performant for range operations, the cross-layered key-value store may allow the system 1 to be suitable for both point queries (e.g., an operation corresponding to a single key-value pair) and range queries (e.g., an operation corresponding to more than one consecutive key-value pairs).

Aspects of embodiments of the cross-layered key value store may provide the flexibility of host CPU processing (e.g., range query processing) and a framework to leverage the processing circuit 220 (e.g., an on-storage FPGA) for near data processing (e.g., lookup operations in a leaf node, data compression, and pre-processing for deep learning). Additionally, with the cross-layered key-value store having decoupled search and data layers, the architecture may be easily scaled onto non-uniform memory access (NUMA) nodes connected to multiple storage devices 200 on a network.

Figure 2:
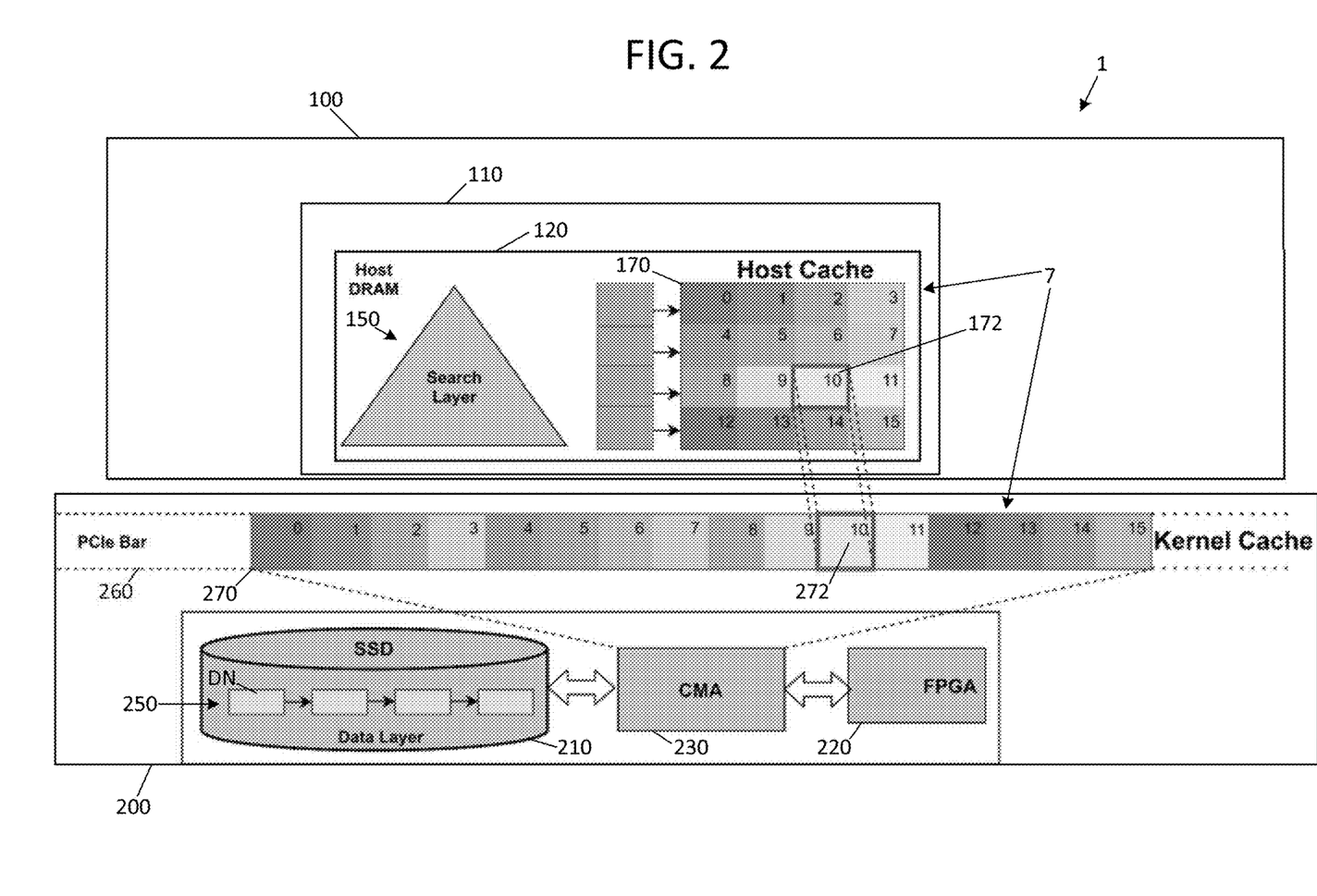
FIG. 2 is a system diagram depicting a data storage system including a host cache and a kernel cache, according to some embodiments of the present disclosure.

FIG. 2 is a system diagram depicting a data storage system including a host cache and a kernel cache, according to some embodiments of the present disclosure.

Referring to FIG. 2, the system 1 may include a mirror cache 7 (or cross-layered cache) that is split across the host memory 120 of the host 100 and the CMA 230 of the storage device 200. The mirror cache 7 may include a host cache 170 (e.g., a metadata cache) on the host memory 120, and a kernel cache 270 (e.g., a data cache) on the CMA 230. The mirror cache 7 provides for data locality (e.g., improved data locality).

Maintaining the metadata cache on the host 100 enables the host processor 110 to act in the control plane and allows the data cache on the CMA 230 to leverage the high-speed peer-to-peer data transfers provided by the computational storage device 200. By offloading the data layer computations to the storage device 200, which might typically be performed by a host of a conventional key-value store, the data access granularity from the storage 210 may be the size of a data page (e.g., 4 KB sized).

Although using a conventional host-based cache in this situation might provide ample capacity to store the data nodes DN (e.g., data pages), using a cross-layered cache may provide several advantages and improvements over using a host-based cache. For example, using a cross-layered cache may: (1) decrease latency to access data pages; (2) decrease network traffic, because the number of hops (e.g., the number of data transfers between the storage 210 and the host 100) would decrease; and (3) leverage the advantages of P2P transfer between the processing circuit 220 and the storage device 200 and, thus, leverage the compute power of the processing circuit 220.

The computational storage device 200 may connect the storage 210 and the processing circuit 220 over an internal data path, thereby enabling high-speed data transfer called peer-to-peer data transfer. This connection may be achieved with an on-chip soft PCIe switch and a device memory of the processing circuit 220. The computational storage device 200 may map both the storage 210 and the memory of the processing circuit 220 (e.g., DRAM) onto a peripheral component interconnect express (PCIe) bar 260 (e.g., PCIe bar memory). The portion of the memory of the processing circuit 220 that is exposed to the PCIe bar 260 may include (e.g., may be) the CMA 230.

The host cache 170 may be stored on the host memory 120 as a set-associative cache that stores metadata and that allows the host processor 110 to act in the control plane to handle cache maintenance operations and to manage concurrent accesses. The host cache 170 may be a hash table that stores metadata of corresponding data nodes DN. For example, each host cache entry 172 may store metadata, such as a logical block address (LBA), a timestamp, a flag to check occupancy, least recently used (LRU) information for eviction, and lock information for concurrent cache access. The host cache 170 may be a two-dimensional (2D) array.

The kernel cache 270 may be stored on the CMA 230 to store the data nodes DN, and to enable the cross-layered key-value store to utilize advantages provided by the computational storage device 200, such as P2P access and reduced network latency. The kernel cache 270 may be a flattened one-dimensional (1D) array (e.g., a large P2P buffer).

The name "mirror cache" indicates a layout feature thereof. For example, each host cache entry 172 on the host cache 170 may store its respective metadata at a same offset as an offset corresponding to a kernel cache entry 272 of a corresponding actual data node DN on the kernel cache 270 (e.g., the tenth entry in the host cache 170 may include metadata corresponding to a data node DN stored at the tenth entry of the kernel cache 270). Thus, the layout of the host cache 170 may mirror the layout of the kernel cache 270. Accordingly, the mirror cache 7 may reduce a number of data movements because, and for example, the presence of an LBA in the host cache 170 may indicate the presence of the corresponding data node DN in the kernel cache 270.

Figure 3A:
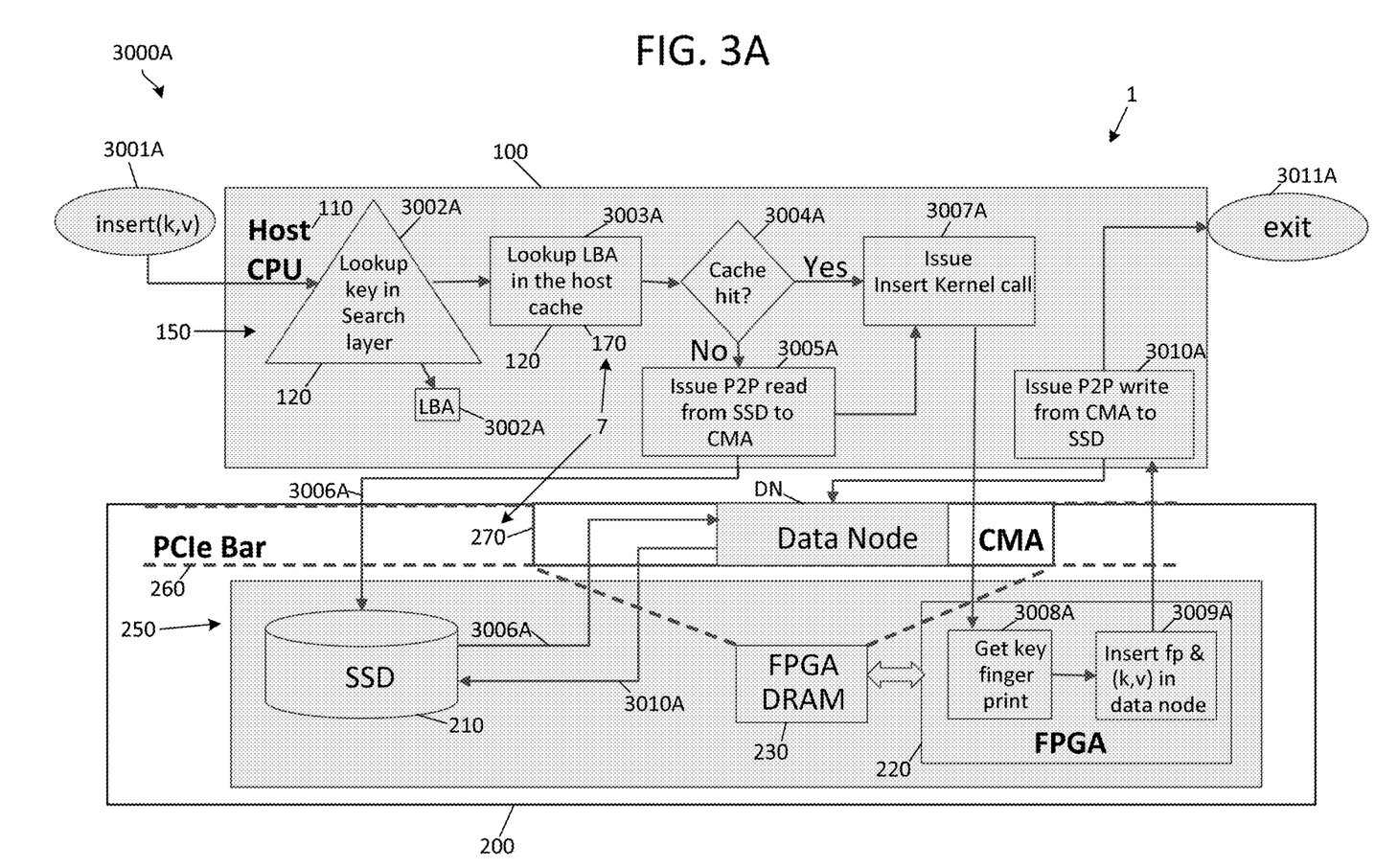
FIG. 3A is a combined flowchart and system diagram depicting operations of methods of data storage within a data storage system, according to some embodiments of the present disclosure.

FIG. 3A is a combined flowchart and system diagram depicting operations of methods of data storage within a system, according to some embodiments of the present disclosure.

Referring to FIG. 3A, a method 3000A for processing a data access request to access a data node DN stored on a storage device 200 in a cross-layered key-value store system 1 may include the following operations.

The host 100 may receive the data access request (e.g., an insert operation with a key-value pair) (operation 3001A).

Control may be passed to the host processor 110, which may have a search layer 150 inside the host memory 120, to enable the lookup of a key (e.g., a partial key) in the search layer 150, noting that the search layer 150 may narrow down to a leaf node internally pointing to an LBA of the data node DN (operation 3002A).

The host processor 110 may use the LBA to look up (e.g., search) the host cache 170, which is also present on the host memory 120, to determine whether the corresponding data node DN is present in the kernel cache 270 of the mirror cache 7 (operation 3003A).

The host processor 110 may search a metadata of the host cache 170, and the search may result in either (i) a cache miss, where the corresponding data node DN is absent from, or not present in, the kernel cache 270, or (ii) a cache hit, where the data node DN is present in the kernel cache 270) (operation 3004A).

Based on determining a cache miss has occurred, the host processor 110 may issue (e.g., trigger or cause) a read (e.g., a P2P read) from a storage 210 to the kernel cache 270 located on a CMA 230 (operation 3005A).

In response to the issuance of the P2P read, control may be passed to the storage device 200 to populate the data node DN onto the kernel cache 270 (operation 3006A). After populating the data node DN into the kernel cache 270, control may be passed back to the host 100.

Based on determining the occurrence of a cache hit, or based on determining that the data node DN has been populated on the kernel cache 270, the host 100 may issue (e.g., may trigger or cause) a kernel call (e.g., an insert kernel call), which may pass control to the processing circuit 220 (operation 3007A).

In response to the kernel call, the processing circuit 220 may read the data node DN from the kernel cache 270 (e.g., may read the data node DN into a local memory in the processing circuit 220), and may retrieve or generate a fingerprint (fp) for the specific key to narrow down the exact location of the key-value pair inside the data node DN (operation 3008A).

Based on determining the exact location of the key-value pair, the processing circuit 220 may perform an operation (e.g., the insert operation) on the data node DN (e.g., the processing circuit 220 may manipulate (e.g., process or perform one or more operations on) the data node DN in the local memory in the processing circuit 220, and may populate an updated data node DN back onto the kernel cache 270) (operation 3009A).

Based on completion of the operation on the data node DN by the processing circuit 220, control may be returned to the host 100 to persist (e.g., to write) the updated data node DN to the storage 210 (e.g., by issuing a P2P write from the CMA 230 back to the storage 210) (operation 3010A).

The method may be completed and exited once the updated data node DN has been persisted to the storage 210 (operation 3011A).

Figure 3B:
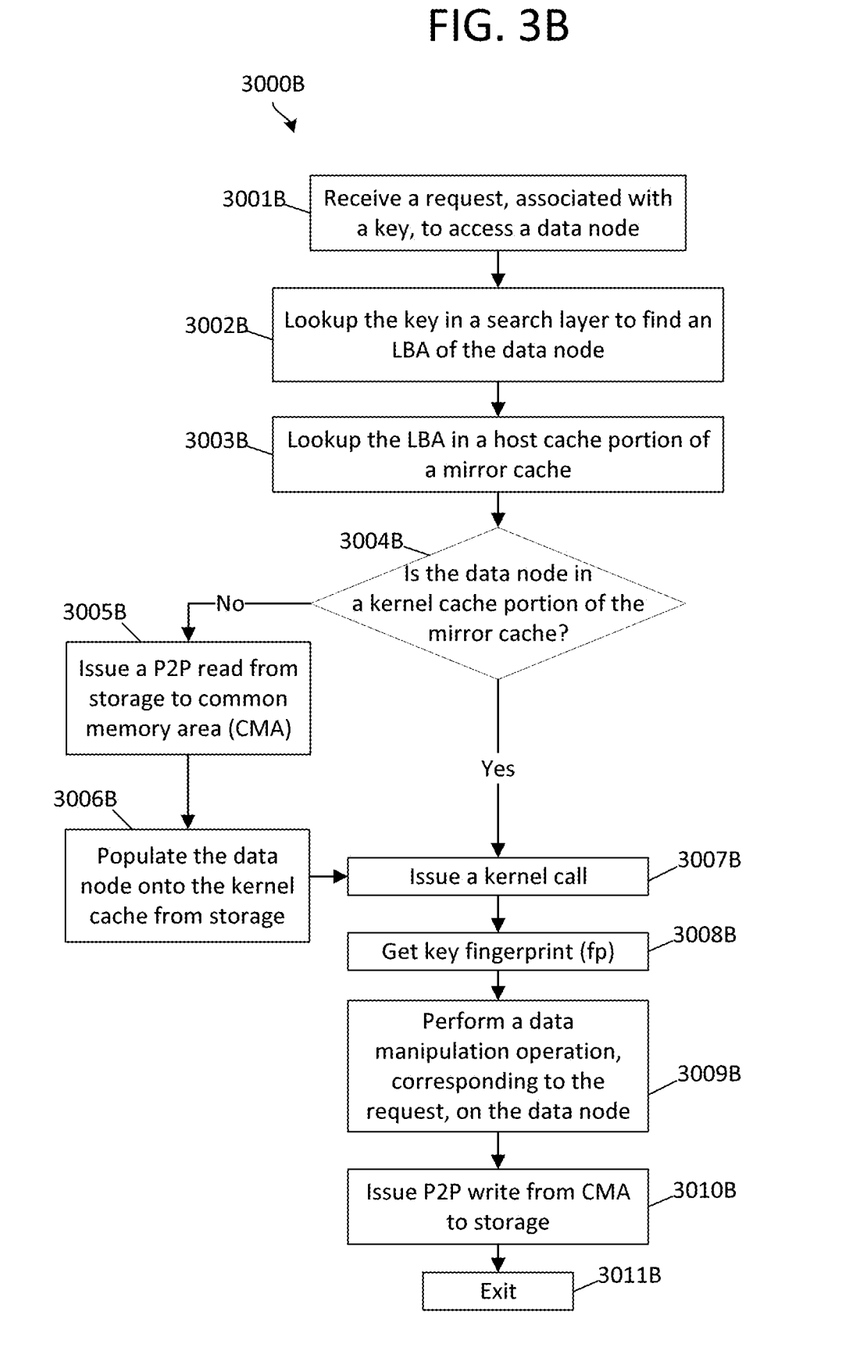
FIG. 3B is a flowchart depicting methods of data storage corresponding to the operations of FIG. 3A, according to some embodiments of the present disclosure.

FIG. 3B is a flowchart depicting operations of methods of data storage corresponding to the operations of FIG. 3A, according to some embodiments of the present disclosure.

Referring to FIG. 3B, the operations discussed above with respect to FIG. 3A (e.g., operations 3001A to 3011A), are discussed in a simplified manner in a flowchart format without depicting the structures of the system 1.

For example, the host processor 110 may receive a request, which is associated with a key, to access a data node DN (operation 3001B).

The host 100 (e.g., a host processor 110 of the host 100) may look up (e.g., locate) the key in a search layer 150 to find information that indicates a location of the data node DN (e.g., to find the LBA of the data node DN) (operation 3002B).

The host 100 may look up (e.g., search for or locate) the LBA in a host cache 170 portion of a mirror cache 7 (operation 3003B).

Based on searching the host cache 170, the host 100 may determine whether the data node DN is present in a kernel cache 270 portion of the mirror cache 7 (operation 3004B).

Based on determining a cache miss, the host 100 may issue (e.g., trigger or cause) a P2P read from storage 210 to a CMA 230 (operation 3005B).

The storage device 200 may populate the data node DN onto the kernel cache 270 from the storage 210 (operation 3006B).

Based on determining a cache hit, or based on determining that the data node DN has been populated into the kernel cache 270, the host 100 may issue (e.g., trigger or cause) a kernel call based on the request (e.g., the request received at operation 3001B) (operation 3007B).

In response to the kernel call, control may be passed to the processing circuit 220 to perform the requested data manipulation (e.g., data processing) operation on the data node DN, and the processing circuit 220 may get a fingerprint (fp) to determine the exact location of the key-value pair inside the data node DN (operation 3008B).

The processing circuit 220 may perform the requested data manipulation (e.g., data processing) operation on the data node DN (operation 3009B).

The host 100 may issue (e.g., trigger or cause) a P2P write to persist the updated data node DN to the storage 210 from the CMA 230 (operation 3010B).

The method may be completed, and operations may be exited once the updated data node DN has been persisted to the storage 210 (operation 3011A).

FIG. 4 is a combined flowchart and system diagram depicting operations of methods of data storage within a system providing variable-length key-value support, according to some embodiments of the present disclosure.

Referring to FIG. 4, in some embodiments, the system 1 may provide for variable-length key-value support. Additionally, as discussed below with reference to FIG. 5, the variable-length key-value support may be implemented to support a method of version-based crash consistency.

In some embodiments, a cross-layered key-value store system 1 may be utilized by AI/ML applications, which deal with relatively large amounts of data spanning multiple data pages, such as images, videos, etc. Because each data node DN, according to aspects of embodiments of the present disclosure, may have a fixed size that is equal to the size of one data page (e.g., 4 KB), the system 1 may be configured to support variable-length key-value pairs by assigning (e.g., allocating or chaining) extension nodes EN to corresponding data nodes DN to accommodate bigger key-value pairs. The extension nodes EN may be provided and allocated by a slab allocator SA (e.g., a host-side helper function) from pools of different-sized data pages (e.g., 4 KB, 8 KB, 16 KB, 32 KB, etc.) to chain to corresponding data nodes DN.

Accordingly, a method 4000 of providing variable-length key-value support may include: receiving, at the host 100, a request (e.g., an insert operation with a key-value pair) to access a data node DN stored at the storage device 200 (operation 4001); looking up (e.g., locating) the corresponding data node DN corresponding to the key-value pair (operation 4002); determining that the data node DN is short on free space (e.g., determining that an amount of available space in the data node DN is less than an amount of space for accommodating the request) (operation 4003); updating a metadata MD of the data node DN to mark the presence of an extension node EN and to add a fingerprint of the extension node EN to the data node DN (e.g., to implement a pointer from the data node DN to the extension node EN, within the data node DN) (operation 4004); and fetching an extension page from the slab allocator SA and adding metadata and the key-value pair to the extension node EN (operation 4005).

Figure 5:
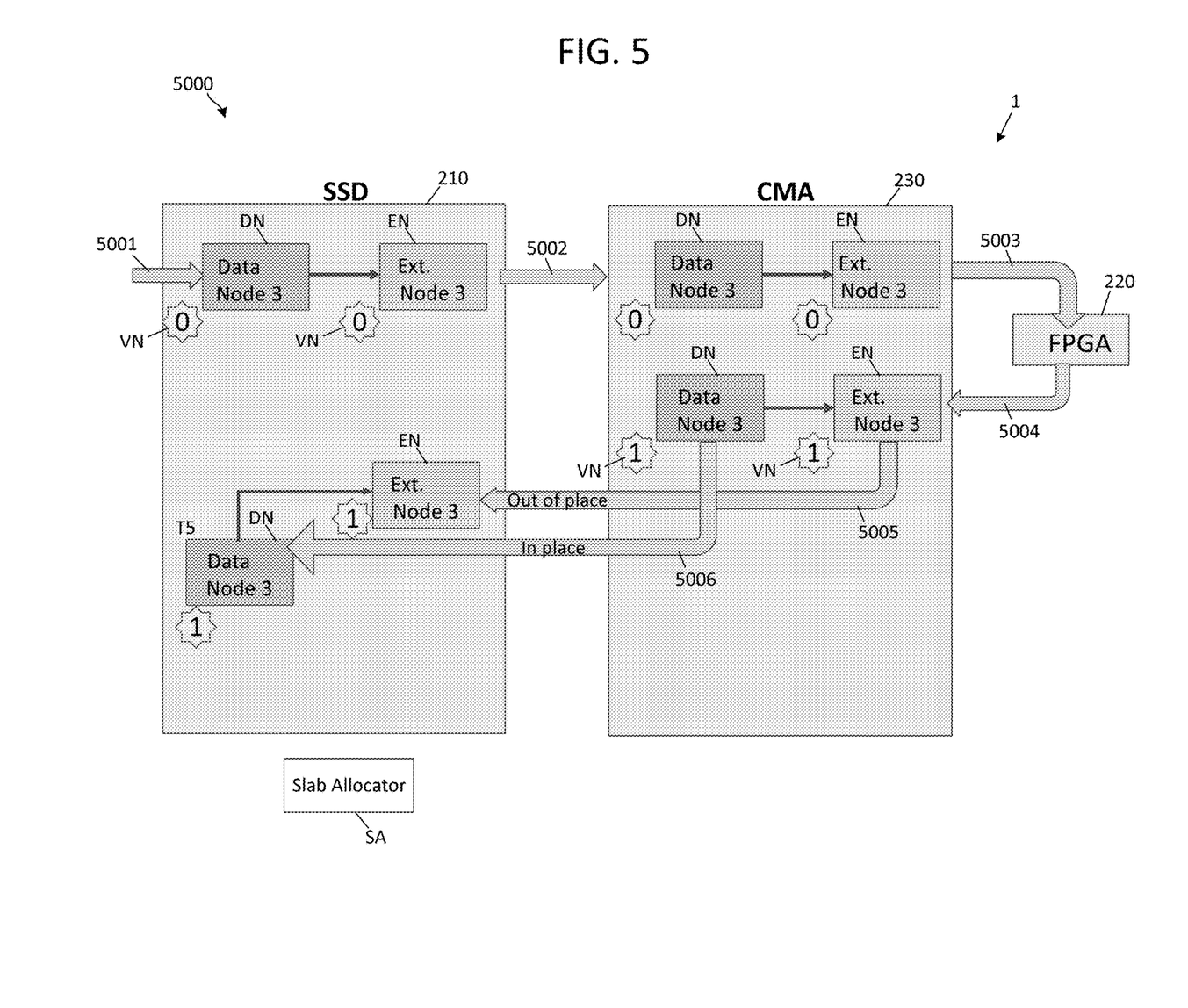
FIG. 5 is a combined flowchart and system diagram depicting operations of methods of data storage within a data storage system providing variable key-value support and version-based crash consistency, according to some embodiments of the present disclosure.

FIG. 5 is a combined flowchart and system diagram depicting operations of methods of data storage within a system providing variable key-value support and version-based crash consistency, according to some embodiments of the present disclosure.

Referring to FIG. 5, in some embodiments, a cross-layered key-value store system 1 may provide a version-based crash consistency policy that uses versioning along with atomic read/writes (e.g., 4 KB atomic read/writes) to avoid overhead costs associated with conventional logging-based crash consistency techniques. A version-based crash consistency model according to aspects of embodiments of the present disclosure may leverage the atomic block read/writes (e.g., 4 KB block read/writes) to make out-of-place updates (discussed below) and identify valid data pages by scanning the entire disk (e.g., storage 210) at a crash.

With versioning, the system 1 may take advantage of atomic read/writes by using the following scheme. An update to a data node DN may be written in an "in-place" manner. For example, the update to the data node DN may be written to storage at a same file offset as its previous version (e.g., at the original location of the previous version of the data node DN).

An update to an extension node EN, whose size is greater than the size of one data page, and which is assigned to the data node DN, may be updated to storage in an "out-of-place" manner. For example, the previous version of the extension node EN may be maintained in its original location (e.g., may not be tampered with), and the updated extension node EN may be written to a different location from the previous version of the extension node EN.

Additionally, to provide correctness (e.g., to guarantee correctness), in the presence of an extension node EN, the data node DN may be written in place after the extension node EN is fully persistent on the storage 210 to provide crash consistency. In the case of a crash (e.g., a power failure) in any state, the previous version of the data node DN may be maintained (e.g., not disturbed), and, if a newer version of the extension node EN is present on the storage 210, it may be garbage collected (e.g., made available for use by other processes running on the system 1) by the slab allocator SA.

Referring still to FIG. 5, a method 5000 for providing variable-length key value support and version-based crash consistency may include the following. The system 1 may process an operation to update an extension node EN (e.g., Ext. Node 3), which had been assigned, by the slab allocator SA, to a data node DN (e.g., Data Node 3), where each of the data node DN and the extension node EN are located in storage 210 and have a same version number VN (e.g., 0) (operation 5001).

The system 1 may create copies of the data node DN and its extension node EN onto the CMA 230 (operation 5002).

The processing circuit 220 may be triggered, based on copies of the data node DN and the extension node EN existing in the CMA 230, to (i) read the data node DN and the extension node EN into its local memory, (ii) perform requested computations based on the operation, and (iii) update the extension node EN based on the operation (operation 5003).

Based on completion of the operation, the processing circuit 220 may write the values (e.g., the updated data node DN and the updated extension node EN) back to the CMA 230 with updated version numbers VN (e.g., updated to 1, such that the metadata MD of the updated data node DN points to the updated extension node EN) (operation 5004).

The updated extension node EN may be persisted (e.g., written) to the storage 210 in an out-of-place manner, such that the previous version of the extension node EN is maintained (e.g., not tampered with) (operation 5005).

Based on the updated extension node EN being completely written to the storage 210, the updated data node DN may be persisted to the storage 210 in an in-place manner (e.g., at the location where the previous version of the data node DN was present), such that the previous version of the data node DN is overwritten with the updated data node DN, resulting in the data node DN pointing to the updated extension node EN because its internal metadata MD (see FIG. 4) had been internally updated to point to the updated extension node EN (operation 5006).

By implementing the method 5000, the system 1, may be resilient in the event of a crash. For example, if a crash occurs while the updated extension node EN is being persisted to the storage 210 (e.g., at operation 5005), because the updated extension node was being persisted to the storage 210 in an out-of-place manner, the operation may be aborted and reran with the partially written extension node being garbage collected.

If a crash occurs while the updated data node DN is being persisted to the storage 210 (e.g., at operation 5006) in an in-place manner, the operation may simply be aborted and rerun (with the partially written extension node being garbage collected), and the system 1 may rollback to the previous versions of both the data node DN and the extension node EN. Accordingly, data loss may be reduced (e.g., prevented).

Figure 6:
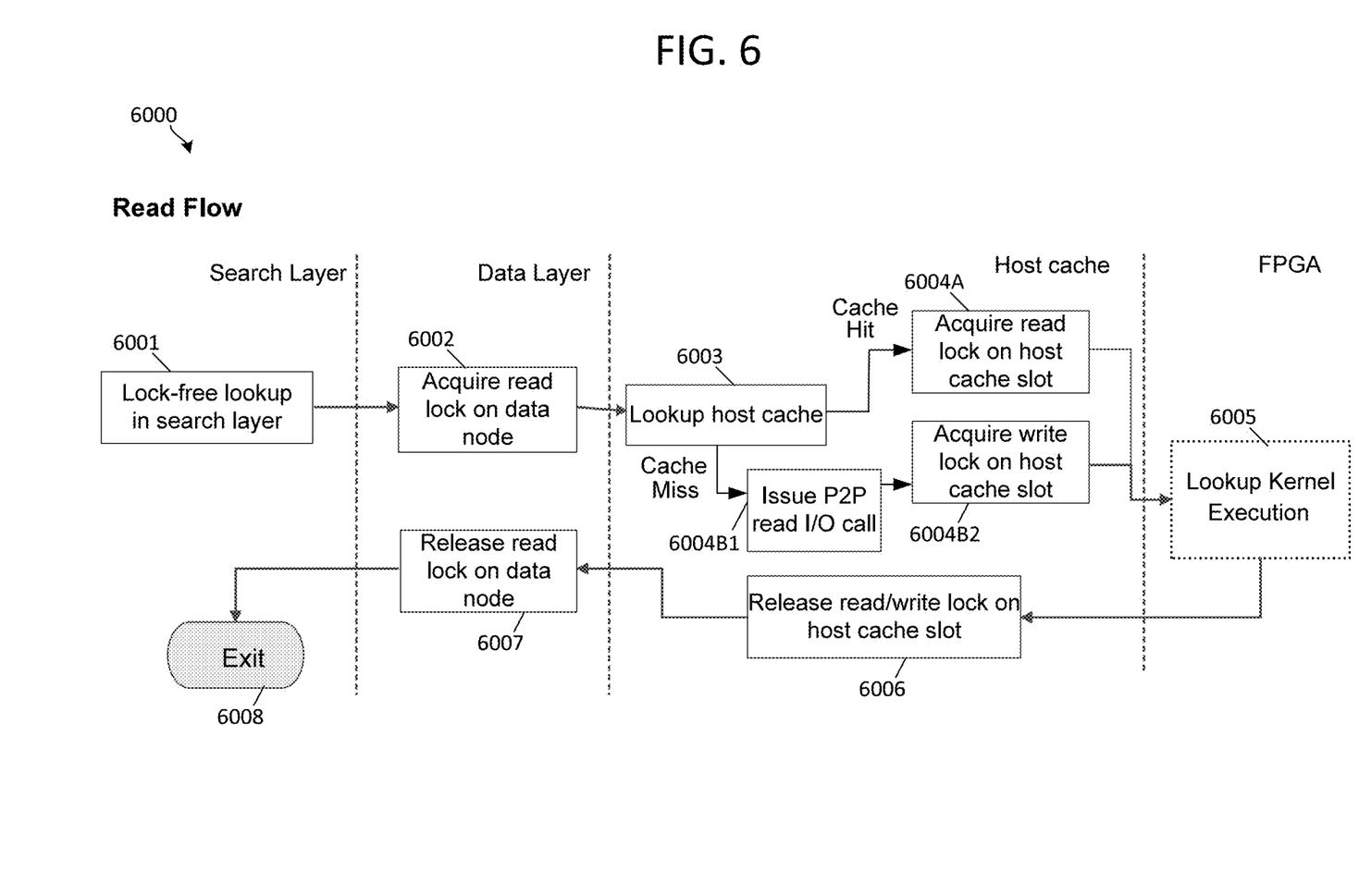
FIG. 6 is a flowchart depicting methods of data storage for a read (or lookup) request, including host-side concurrency control, according to some embodiments of the present disclosure.

FIG. 6 is a flowchart depicting operations of methods of data storage for a read (or lookup) request, including host-side concurrency control, according to some embodiments of the present disclosure.

Referring to FIG. 6, the host 100 (see, e.g., FIG. 1 and FIG. 2) may control concurrent access to the storage device 200 by implementing a method of read concurrency 6000 (e.g., for a lookup operation), which may include: incurring a lock-free lookup on the search layer (operation 6001); traversing, by the host 100, a meta-structure of the data node DN to acquire a read lock on the data node DN (operation 6002); looking up (e.g., locating or searching for), by the host 100 using an LBA that has been found, the LBA in the host cache 170 to thereby find the location of the data node DN on the kernel cache 270 (operation 6003); in the case of a cache hit, acquiring a read lock on a host cache slot (operation 6004A); in the case of a cache miss, issuing (e.g., triggering or causing) a P2P read I/O call to load the data node DN from the storage 210 to the kernel cache 270 (operation 600461) and acquiring a write lock on the host cache slot (operation 600462); based on the kernel cache being ready with the data node DN at the found offset, triggering a lookup kernel on the processing circuit 220 (e.g., the FPGA) (the system 1 may issue (e.g., trigger or cause) multiple compute units for each kernel function to achieve concurrency on the kernel side) (operation 6005); based on kernel execution being completed, control may be passed back to the host 100, and, before exiting the application, the host 100 may release the read/write (mirror cache) lock on the host cache slot (operation 6006) and the read lock on the data node DN meta-structure (operation 6007); and the method may be exited (operation 6008).

Figure 7:
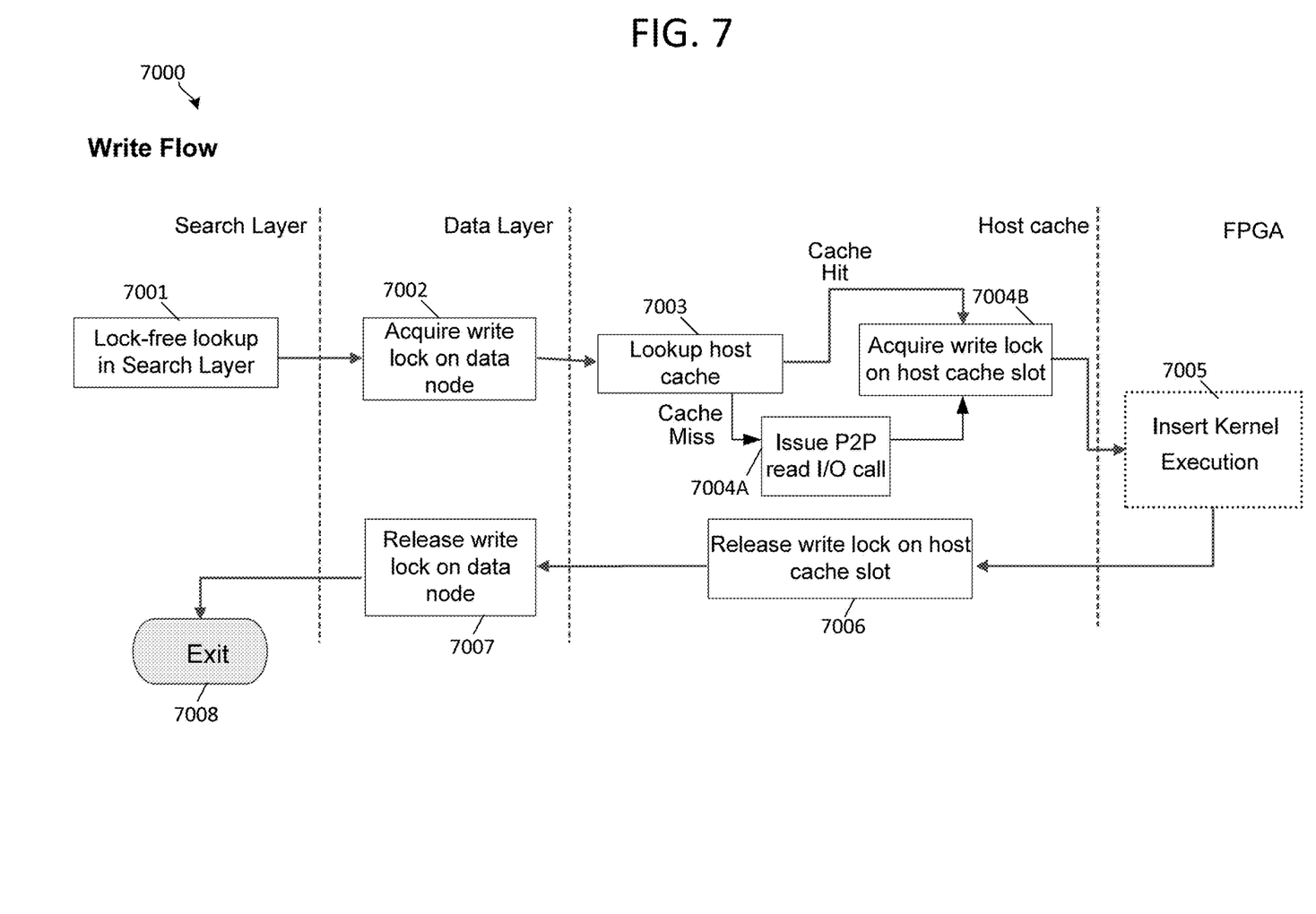
FIG. 7 is a flowchart depicting methods of data storage for a write request including host-side concurrency control, according to some embodiments of the present disclosure.

FIG. 7 is a flowchart depicting operations of methods of data storage for a write (or insert) request, including host-side concurrency control, according to some embodiments of the present disclosure.

Referring to FIG. 7, the host 100 (see, e.g., FIG. 1 and FIG. 2) may control concurrent access to the storage device 200 by implementing a method of write concurrency 7000 (e.g., for an insert operation), which may include: incurring a lock-free lookup on the search layer (operation 7001); traversing, by the host 100, a meta-structure of the data node DN to acquire a write lock on the data node DN (operation 7002); looking up (e.g., locating or searching for), by the host 100 using an LBA that has been found, the LBA in the host cache 170 to thereby find the location of the data node DN on the kernel cache 270 (operation 7003); in the case of a cache miss, issuing (e.g., causing or triggering) a P2P read I/O call to load the data node DN from the storage 210 to the kernel cache 270 (operation 7004A) and acquiring a write lock on a host cache slot (operation 7004B); in the case of a cache hit, acquiring a write lock on a host cache slot without issuing (e.g., without triggering or without causing) a P2P read I/O call (operation 7004B); based on the kernel cache being ready with the data node DN at the found offset, triggering an insert kernel on the processing circuit 220 (e.g., the FPGA) (the system 1 may issue (e.g., trigger or cause) multiple compute units for each kernel function to achieve concurrency on the kernel side) (operation 7005); based on kernel execution being completed, control may be passed back to the host 100, and, before exiting the application, the host 100 may release the write (mirror cache) lock on the host cache slot (operation 7006) and the write lock on the data node DN meta-structure (operation 7007); and the application may be exited (operation 7008).

Accordingly, and referring back to FIG. 2, aspects of embodiments of the present disclosure may provide advantages and improvements over conventional key-value stores, such as reducing bottlenecks at a host processor 110, and leveraging high internal bandwidth and near-data computations of a computational storage device 200. Such advantages and improvements may be achieved by logically and physically splitting the key-value store between the host 100 and the computational storage device 200. Accordingly, responsibilities associated with a search layer 150 may be performed by the host 100, while responsibilities associated with a data layer 250 may be performed by the computational storage device 200. The disclosed embodiments also provide the structural advantages of a mirror cache 7, including a host cache 170 stored on the host 100 and a kernel cache 270 stored on a CMA 230 of the computational storage device 200.

While embodiments of the present disclosure have been particularly shown and described with reference to the embodiments described herein, it will be understood by those of ordinary skill in the art that various changes in form and details may be made therein without departing from the spirit and scope of the present disclosure as set forth in the following claims, with functional equivalents thereof to be included therein.

What is claimed is:

1. A data storage system comprising:
a host comprising a host cache portion of a mirror cache, the host cache portion for storing metadata indicating a location of a data node that is stored in a kernel cache portion of the mirror cache; and
a storage device comprising the kernel cache portion located in a common memory area, wherein:
a first host-cache entry of the host cache portion includes metadata associated with a first kernel-cache entry of the kernel cache portion;
a second host-cache entry of the host cache portion includes metadata associated with a second kernel-cache entry of the kernel cache portion; and
an order of the first host-cache entry and the second host-cache entry in the host cache portion is the same as an order of the first kernel-cache entry and the second kernel-cache entry in the kernel cache portion.

2. The data storage system of claim 1, further comprising:
a search layer on the host; and
a data layer on the storage device.

3. The data storage system of claim 2, wherein the search layer comprises a tree structure, and
wherein the data layer comprises the data node corresponding to a leaf node within a doubly-linked list of leaf nodes corresponding to the tree structure.

4. The data storage system of claim 1, wherein the storage device further comprises:
a persistent memory coupled to the common memory area; and
a processing circuit coupled to the common memory area.

5. The data storage system of claim 4, wherein the processing circuit is configured to perform a data operation on the data node, and is configured to write the data node to the kernel cache portion as an updated data node.

6. The data storage system of claim 5, wherein the host is configured to:
determine the updated data node is populated onto the common memory area; and
cause a peer-to-peer write from the common memory area to the persistent memory.

7. The data storage system of claim 1, wherein the host is configured to:
determine that an amount of available space in the data node is less than an amount of space for accommodating a data access request corresponding to the data node; and
assign an extension node to the data node.

8. The data storage system of claim 7, wherein the storage device further comprises a processing circuit configured to update metadata of the data node to point to the extension node,
wherein the metadata of the data node indicates a first version number, and
wherein metadata of the extension node indicates the first version number.

9. The data storage system of claim 8, wherein the processing circuit is configured to:
update the extension node;
update the metadata of the data node to indicate a second version number to identify the data node as an updated data node;
update the metadata of the extension node to indicate the second version number to identify the extension node as an updated extension node; and
update the metadata of the updated data node to point to the updated extension node.

10. The data storage system of claim 9, wherein the processing circuit is configured to:
write the updated extension node to a storage of the storage device in an out-of-place manner; and
write the updated data node to the storage in an in-place manner.

11. The data storage system of claim 1, wherein the host is configured to manage concurrent access to the storage device by:
receiving a read request and acquiring a read lock on the data node; or
receiving a write request and acquiring a write lock on the data node.

12. A method of data storage, the method comprising:
locating, in a host cache portion of a mirror cache, metadata indicating a location of a data node stored in a storage device, the host cache portion being stored on a host; and
determining that the data node is present in a kernel cache portion of the mirror cache, the kernel cache portion being stored on a common memory area of the storage device, wherein:
a first host-cache entry of the host cache portion includes metadata associated with a first kernel-cache entry of the kernel cache portion;
a second host-cache entry of the host cache portion includes metadata associated with a second kernel-cache entry of the kernel cache portion; and
an order of the first host-cache entry and the second host-cache entry in the host cache portion is the same as an order of the first kernel-cache entry and the second kernel-cache entry in the kernel cache portion.

13. The method of claim 12, further comprising locating, by the host, a partial key in a search layer to find the metadata indicating the location of the data node.

14. The method of claim 12, further comprising:
determining that the data node has an amount of available space that is less than an amount of space for accommodating a data access request; and assigning an extension node to the data node.

15. The method of claim 14, wherein the storage device comprises:
   a persistent memory coupled to the common memory area; and
   a processing circuit coupled to the common memory area.

16. The method of claim 15, further comprising updating, by the processing circuit, metadata of the data node to point to the extension node,
   wherein the metadata of the data node and metadata of the extension node indicate a first version number.

17. The method of claim 16, further comprising:
   updating the extension node;
   updating the metadata of the data node to indicate a second version number;
   updating the metadata of the extension node to indicate the second version number, the second version number identifying the data node as an updated data node and identifying the extension node as an updated extension node; and
   updating the metadata of the updated data node to point to the updated extension node.

18. The method of claim 17, further comprising:
   writing the updated extension node to a storage of the storage device in an out-of-place manner; and
   writing the updated data node to the storage in an in-place manner.

19. A non-transitory computer readable medium implemented on a key-value store, the non-transitory computer readable medium having computer code that, when executed on a processor, implements a method of data storage, the method comprising:
   locating, in a host cache portion of a mirror cache, a host cache metadata indicating a location of a data node stored in a storage device; and
   determining that the data node is present in a kernel cache portion of the mirror cache in accordance with the host cache metadata, the kernel cache portion being stored on a common memory area of the storage device, wherein:
   a first host-cache entry of the host cache portion includes metadata associated with a first kernel-cache entry of the kernel cache portion;
   a second host-cache entry of the host cache portion includes metadata associated with a second kernel-cache entry of the kernel cache portion; and
   an order of the first host-cache entry and the second host-cache entry in the host cache portion is the same as an order of the first kernel-cache entry and the second kernel-cache entry in the kernel cache portion.

20. The non-transitory computer readable medium of claim 19, wherein the method further comprises locating a partial key in a search layer to find the host cache metadata.

* * * * *